INVENTOR
MORT ROY MILLER
FRANKLIN SAMUEL BONNER
BY Lloyd Spencer
ATTORNEY

Feb. 25, 1941.     F. S. BONNER ET AL     2,233,045
ELECTRICAL FISH SCREEN
Filed June 13, 1938     3 Sheets-Sheet 2

INVENTORS
MORT ROY MILLER
FRANKLIN SAMUEL BONNER
BY Lloyd Spencer
ATTORNEY

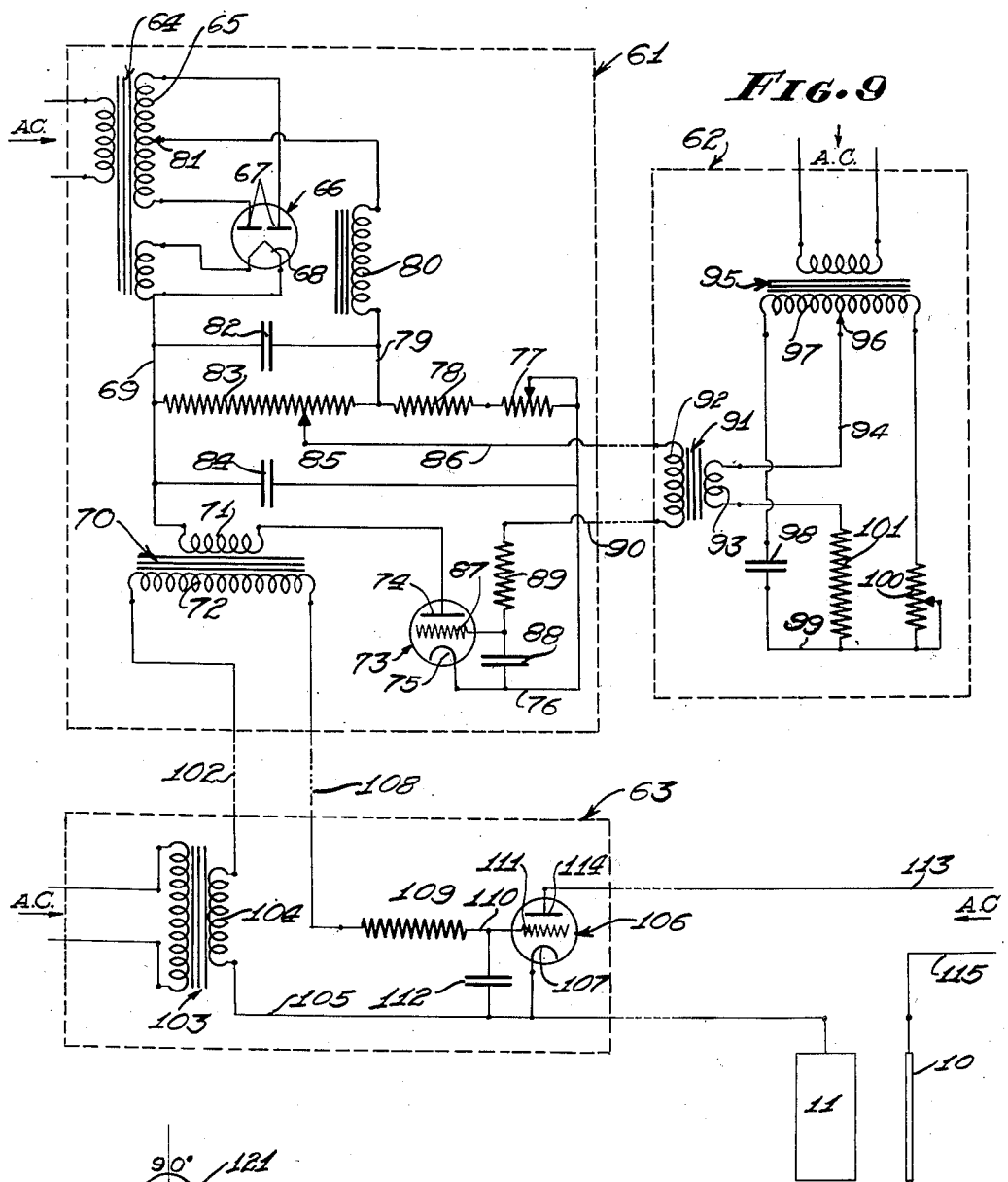

Patented Feb. 25, 1941

2,233,045

UNITED STATES PATENT OFFICE 2,233,045

ELECTRICAL FISH SCREEN

Franklin Samuel Bonner, Kootenai, Idaho, and Mort Roy Miller, Huntington Park, Calif.

Application June 13, 1938, Serial No. 213,472

9 Claims. (Cl. 119—3)

Our invention relates to electric fish screens; that is, to fish screens which establish an electrified barrier zone to divert or exclude fish from predetermined areas or channels.

Among the objects of our invention are:

First, to provide a fish screen of this character and method of operation whereby electrical impulses are applied to predetermined zones, the impulses being applied at such frequency and for such duration to establish the desired physiological effect in the fish without injury.

Second, to provide an apparatus and method of this character whereby the average value of each current impulse bears a substantial relationship to the peak value thereof, so that the rheobase and chronaxie factors governing excitation of living tissue are employed in the most effective manner.

Third, to provide an apparatus of this character whereby an electrified zone of gradually increasing strength is established with the current flow in a direction substantially longitudinally of the fish when it assumes its normal or natural position longitudinally in a moving body of water.

Fourth, to provide an apparatus and method of applying electrical energy to establish a fish repelling barrier whereby a minimum consumption of power is required to maintain an effective barrier.

Fifth, to provide an apparatus of this character which is harmless both to humans as well as fish and animals.

Sixth, to provide an apparatus of this character which, in one embodiment, may be self contained and particularly suited for operation from such water power as may be available at the site where it is installed.

Seventh, to provide an apparatus of this character which may be easily installed and readily maintained in operative condition over long periods without attention.

With the above and other objects in view as may hereinafter appear, reference is made to the drawings in which:

Fig. 9 is a wiring diagram illustrating a further modified form of our energizer which is particularly economical of power and which establishes the type of wave form found most satisfactory in creating the desired physiological reaction in fish.

Fig. 10 is a graph illustrating a typical wave form obtained by the arrangement shown in Fig. 9.

Figure 1:
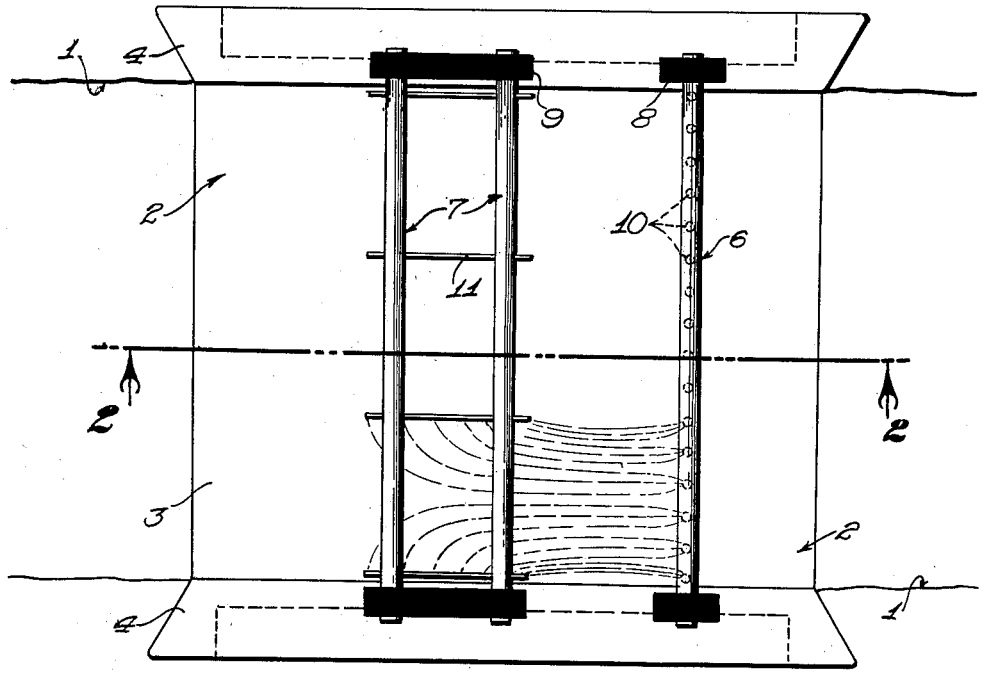
Fig. 1 is a substantially diagrammatical plan view of an irrigation ditch or the like across which is established an electrical fish screen embodying our invention.
Figure 2:
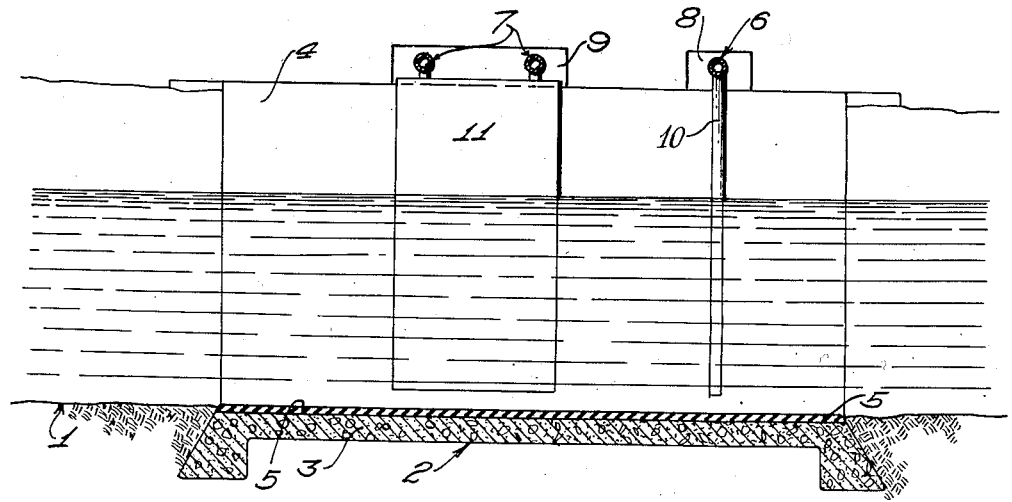
Fig. 2 is a longitudinal sectional view thereof taken substantially through 2—2 of Fig. 1.

Our apparatus consists essentially of a barrier structure illustrated particularly in Figs. 1 and 2 and an electrical energizer system, of which several arrangements are shown in the remaining figures as indicated above.

Barrier structure

The ditch, water-way, channel or stream from which it is desired to divert or bar fish is indicated by 1. Interposed therein is a cement lined section 2, which in practice may be a diversion gate or sluice way which often forms the entrance to a stream or irrigation ditch or the like from which it is desired to bar fish. Such a section 2 comprises a bottom 3, and side walls 4. For the purposes of employing our apparatus, the side walls and bottom are coated with insulation material 5. In those instances where strength may not be a factor and erosion is nominal merely a coating or layer of asphaltum or analogous insulation material may be applied directly to the face of the ditch or stream. Or further, particularly for temporary and small installations insulation may be accomplished by rubber matting or the like. With any of the arrangements mentioned the essential feature is an insulated section of the stream or ditch in which the barrier is installed, to avoid dissipation of an electrical field that may be established into the stream bed.

The insulated section 2 is bridged by an electrode element suporting means 6, and an electrode plate supporting arrangement 7 which are mounted on insulation members 8 and 9 respectively. A plurality of electrode elements 10 depend from the supporting means 6, while electrode plates 11 depend from the supporting arrangement 7. The supporting means and arrangement may vary from simple rods to more elaborate trusses or cable suspensions depending on the width and character of the installation.

The electrode plates are placed on the upstream side of the electrode elements or on the side from which the fish approach and the plates are disposed in parallel relation with each other with their planes longitudinally with the stream. Also the electrode plates, while fewer in number than the electrode elements, present a substantially greater surface. Assuming that the electrode plates and elements are connected respectively to opposite sides of an energizer, which will be described hereinafter, operation of the barrier thus formed is as follows:

The water functions as a conductor rather than a dielectric because of the dissolved salts which are always present, and the fish's body shunts out adjoining sections of water which are at different potentials. The greatest effect is obtained when his body is parallel with the direction of current flow. The potential gradient obtained is by virtue of the IR (current-resistance) drop through the water, and inasmuch as the water is homogeneous or substantially so, the only variable is the I or current. Consequently, because of the proportionality between potential gradient and current density, an arrangement of electrodes may be had wherein the electric current flow may be longitudinal with the flow of water in the stream and may increase gradually from the leading edges of the electrode plates to the electrode elements.

This ideal condition is approached within practical limits with the ilustrated arrangement of electrode elements and plates. The combined area of the plates is greater than that of the elements; consequently, the current density is greatest at the elements and diminishes gradually toward the plates, and continues to diminish gradually from the trailing edge, or right hand edge as viewed in Figs. 1 and 2, to the leading, or left hand edge thereof.

Tests have indicated that the gradation of current density is approximately uniform except in immediate proximity to the electrode elements beyond the region which the fish will penetrate. The current density in the planes of the several electrode plates and between the plates and electrodes is slightly higher than in the space between the plates, but not to the extent of establishing a lethal current density. The effect of this is to establish "lanes" between the plates which tend to cause the fish to assume a longitudinal position with respect to the current flow whether the barrier is in a stream or in still water.

Because only that portion of the electrical power which is applied to energize the water has any effect, it is of course obvious that insulation of the stream bed and banks is important.

*Energizer*

Effectiveness of the electrical barrier is also dependent upon the character of electrical energy applied. It has been found that a direct current or a continuous supply of current tends to "paralyze" the fish rather than induce the desired physiological or muscular reaction to cause the fish to avoid the barrier. Furthermore, the particular pattern of electrical impulse plays an important part in stopping the fish without injury or prohibitive consumption of power.

In considering the effect of electrical stimula on tissue removed from animal subjects, there has developed a nomenclature to indicate two factors which appear important, namely, "rheobase" or weakest sustained current that will excite animal tissue, and "chronaxie" or least duration of current at (arbitrarily) twice the value of the rheobase which will excite. Thus, a strong impulse of short duration has no more effect than a weak impulse of long duration. Therefore the most effective impulse is one in which the average value of the impulse for its life bears a substantial relationship to its maximum value, otherwise the power applied to establish the impulse will be largely wasted. In each of the energizers described hereinafter consideration is given to the above factors to establish the impulse pattern approaching the ideal.

A further factor, but one of easier solution is proper selection of the time between impulses, for it is necessary to allow sufficient time for the reaction to a given impulse to be established and substantially normal conditions of the tissue be resumed before application of a second impulse, otherwise the impulses will become cumulative and possibly prove fatal.

Figure 3:
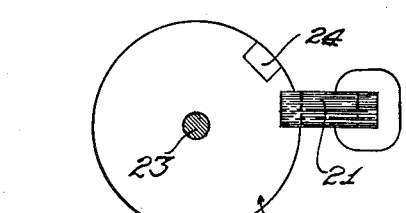
Fig. 3 is a side view of one embodiment of our energizer shown substantially diagrammatically.
Figure 4:
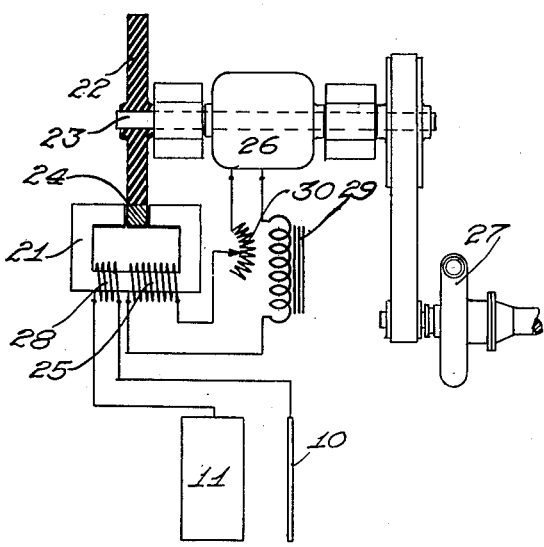
Fig. 4 is another diagrammatical view thereof shown in association with a local water power plant.

With reference to the arrangement illustrated in Figs. 3 and 4, a field core 21 is provided which may be C-shaped and form a gap for an armature wheel 22. The armature wheel 22 is mounted on a suitable drive shaft 23 and comprises comparatively nonpermeable material except for a single or substantially spaced permeable or magnetic inserts 24 which pass periodically between the poles of the field core 21 as the wheel is rotated. The speed of the wheel and arrangement of inserts determine the frequency of impulse.

The field core 21 is provided with an input coil 25 connected through a choke coil 29 and rheostat 30 or the like with a source of D. C. current which may be provided from a generator 26 driven suitably from or with the shaft 23 or the current may be supplied from an extraneous source. Inasmuch as fish barriers of the type herein contemplated are usually installed in places where electrical power is not available it may be desirable to drive the generator and armature wheel by water power such as a turbine or water wheel 27.

A pick-up coil 28 is also wound on the core 21 and leads therefrom are connected to the electrode elements 10 and electrode plates 11.

Figure 5:
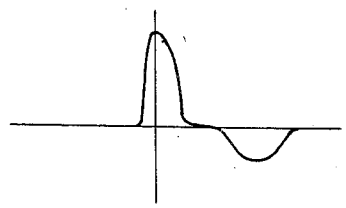
Fig. 5 is a graph indicating a typical wave form obtained with the embodiment shown in Figs. 3 and 4.

Operation of the form of energizer shown in Figs. 3 and 4 is as follows:

A source of constant potential D. C. current is supplied to coil 25 through choke coil 29 from generator 26. During the period that the nonmagnetic portion of disc is in gap, current is established and reaches a practically constant value determined by the value of the voltage of supply and the ohmic resistance of the circuit. The ampere turns and inductance of the choke 29 should be numerically high in terms of the same value of coil 25. As the segment 24 of permeable material suddenly enters the gap of the core 21 the reluctance of the magnetic path linking field coil 25 and pick-up coil 28 is reduced greatly and there is a tendency to increase the magnetic flux through this path by an amount inversely proportional to and at a rate equal to the change in reluctance. However, this very change in flux induces a voltage in coil 25 opposite in sign to the voltage from generator 26, and this induced voltage tends to decrease the current flowing through coil 25, thus decreasing the magnetomotive force through core 21 and so decreasing the rate of change of flux through coils 25 and 28, and thus decreasing the rate of rise and the maximum voltage induced in the pick-up coil 28. This inherent deficiency of the circuit is greatly corrected by the introduction of inductance choke 29 into the circuit. The inductance of choke 29 is relatively high as compared with the inductance of coil 25. By virtue of its very self-inductance, a voltage is induced in choke 29 by any decrease of current through the choke, said voltage being in such a direction as to oppose said decrease in current. Thus when the induced voltage in the coil 25 tends to decrease the current through itself and the choke 29, a voltage is induced in the choke which opposes this decrease and by proper design the influence of voltage induced in the choke 29 can predominate and control the current through the input coil 25 and so determine the voltage induced in the output coil 28 and current through the screen. This means that a relatively large amount of energy stored in the choke coil 29 is suddenly released to force a rapid change of flux through coils 25 and 28 when the permeable segment 24 enters the core 21, thus giving a rapid rate of rise to the impulse, as shown in Fig. 5 in the water between plates 10 and 11. As the segment leaves the core the opposite reactions occur to prevent a rapid decrease of flux and to result in a lazy, slow changing wave of minimum voltage on the reversed wave, also as indicated in Fig. 5. This is a desirable result in all respects.

Figure 6:
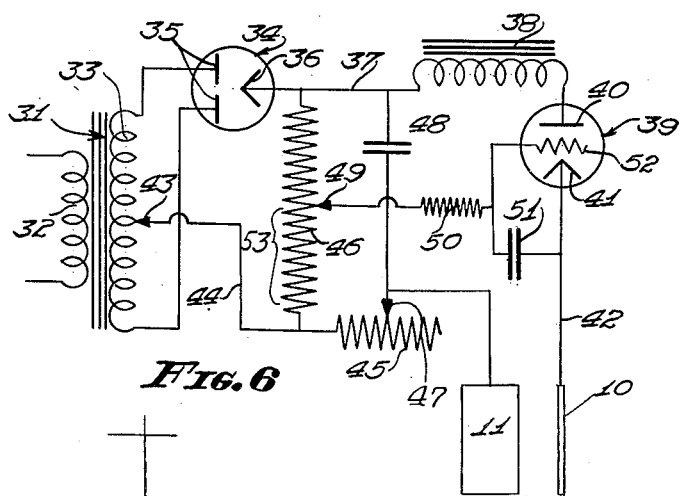
Fig. 6 is a wiring diagram illustrating a modified form of our energizer wherein moving parts are eliminated.

Reference is now made to Fig. 6. The energizer here illustrated employs the periodic discharge of a condenser modified by a reactance which tends to reduce the peak of the condenser discharge and prolong the duration of the impulse, more specifically:

A transformer 31 having a primary coil 32 and center tapped secondary coil 33 the ends of which are connected with the plates 35 of a rectifier 34 is provided. The cathode 36 of the rectifier is connected through a lead 37, and a reactance 38 to the plate 40 of an electronic valve known commercially as a "Thyratron" tube 39. The cathode 41 of said Thyratron tube is connected by lead 42 to one electrical side of the fish screen such as the electrode elements 10.

The center tap 43 of the transformer 31 is connected through lead 44 and a frequency control resistance 45. A bias control resistance 46 is connected between leads 37 and 44. Connected between lead 37 and an adjustable point 47 on the frequency control resistance 45 is a condenser 48 having sufficient capacity as well as voltage rating to meet the requirements of the fish screen. A lead extends from such adjustable point 47 to the other electrical side of the fish screen such as electrode plates 11. A movable tap 49 is provided on the bias control resistance 46 which is connected through a condenser 51 to the lead 42 and through a resistance 50 to a grid 52 of the Thyratron tube 39.

Operation of the circuit shown in Fig. 6 is as follows:

Condenser 48 is charged by the rectified A. C. power supplied by the transformer 31 through the rectifier 34. When the voltage across the section of the bias control resistor indicated by 53 is equal, approximately, to the voltage drop across the frequency control resistance 45, the grid 52 of the control Thyratron 39 becomes sufficiently positive with reference to the cathode 41 and the Thyratron becomes conductive allowing the condenser 48 to discharge through the reactance 38 to the fish screen or barrier. As the condenser discharges an appreciable voltage or counter E. M. F. is built up in the reactance 38 which reduces the peak voltage of the condenser discharge as applied at the fish barrier, but as the voltage of the condenser decays the reactance returns to the circuit the energy stored in it during the initial action of the condenser.

The modification of the condenser discharge by the reactance 38 is of primary importance in the operation of the circuit shown in Fig. 6 for the reason that the wave form established by normal condenser discharge is entirely unsatisfactory to induce the desired physiological reaction on the fish. As pointed out hereinbefore, the ideal condition requires that the average value of the impulse for its duration bear a substantial relationship to its maximum value. An unmodified condenser discharge is characterized by a sudden rise in potential (instanteneously assuming no inductance in the circuit) and thereafter a rapid decay wherein the time required to return to half its peak voltage is extremely small as compared to the time required to return to zero. Consequently, an unmodified condenser discharge system is extremely wasteful of power and requires expensive equipment in order to produce the desired results.

Figure 7:
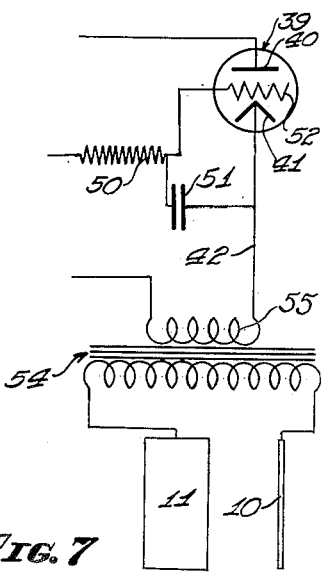
Fig. 7 is a wiring diagram illustrating a variation of the arrangement shown in Fig. 6.

In place of the reactance 38, a transformer 54 may be provided. The primary 55 thereof is connected between the frequency control resistance 45 and lead 42 from the bias control resistor of the tube 37 and lead 42, while the secondary is connected to the electrodes 10 and 11 of the fish barrier as shown in Fig. 7. This likewise serves to dampen the peak of the condenser discharge and prolong the duration of the impulse and further provides a selection of the primary and secondary voltages suitable for the fish screen and the Thyratron circuit.

Figure 8:
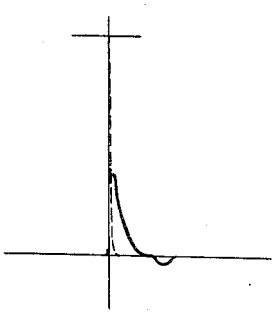
Fig. 8 is a graph illustrating a typical wave form produced by the arrangements shown in Figs. 6 and 7.

A typical curve of the condenser discharge between the plates 10 and 11 obtained with the arrangements shown in Figs. 6 and 7 is shown in Fig. 8 with an indication by dotted lines of an unmodified condenser discharge for comparison. At best the arrangements shown in Figs. 6 and 7, while operative, do not produce the ideal type of impulse. A more preferred arrangement is shown in Fig. 9.

The arrangement here illustrated comprises generally a timer 61, phase shift and synchronizing network 62, and power control unit 63. In the timer 61, a transformer 64 is connected by the extremities of its center tapped secondary 65 to the plates 67 of a full wave rectifier 66.

The cathode 68 of the rectifier 66 is connected through lead 69 to the low voltage primary 71 of a transformer 70, the secondary 72 of which is connected with the power control unit 63 as will be described hereinafter. The primary 71 is connected with the plate 74 of a Thyratron tube 73. The circuit is completed back to the transformer 64 through cathode 75 of the tube 73, lead 76, variable resistance 77, resistor 78, lead 79, smoothing reactor 80 and center tap 81 of the transformer 64.

A smoothing capacitor 82 is connected between leads 69 and 79, as is also a grid resistor 83. Also a condenser 84 for control of tube 73 is connected between leads 69 and 76.

A variable tap 85 engages resistor 83 and a lead 86 therefrom extends to the phase shift and synchronizing network 62. A grid 87 of the tube 73 is connected through a condenser 88 to lead 76 and through resistor 89 to a lead 90 extending with lead 86 to the network 62 which will now be described:

The leads 86 and 90 connect to the ends of a secondary winding 92 of a peaking transformer 91 fed by a low voltage primary 93 connected by lead 94 to the center tap 96 of a secondary coil 97 of a transformer 95. A circuit is provided between the extremities of the secondary coil 97 through a condenser 98 lead 99 and variable resistance 100. The primary 93 of the transformer 91 is also connected through a resistance 101 to the lead 99.

Reference is now directed to the power control unit 63. A lead 102 connects the secondary 72 of transformer 70 in series with the secondary 104 of a bias transformer 103 which in turn is connected through lead 105 to the cathode 107 of the power control Thyratron 106. The other lead 108 of transformer 70 is connected through resistor 109 and lead 110 to the grid 111 of tube 106. A condenser 112 is interposed between leads 105 and 110.

A source of A. C. power is connected by one lead 113 through a plate 114 in the Thyratron 106 and cathode 107 thereof to one electrode system of the barrier, while the other lead 115 from such source of A. C. power is connected directly to the other electrode system of the fish barrier.

Operation of the arrangement comprising timer 61, phase shift and synchronizing network 62, and power control unit 63 is as follows:

The rectifier tube 66, smoothing reactor 80, and smoothing condenser 82 constitute the source of D. C. control power. Capacitor 84 is charged through resistors 77 and 78 depressing the cathode 75 of tube 73. As soon as the cathode potential approaches the peak potential of the peaking transformer 91, capacitor 84 discharges through the primary winding 71 of transformer 70 and through tube 73. Due to the leakage inductance of the primary winding 71, tube 73 communicates out and the capacitor 84 again recharges through resistors 77 and 78.

The frequency may be established by adjustment of the variable resistance 77, and capacitor 84 (which may be adjustable), as well as the magnitude of the peak potential from transformer 91 and the adjustment of the tap 85 of resistor 83. Actually, such constants are selected that adjustment of resistance 77 alone will vary the frequency of the oscillations within the desired range.

Each time tube 73 discharges capacitor 84, a high voltage peak is generated in the secondary winding 72 of transformer 70 thereby firing the power control tube 106 which is normally maintained non-conducting by the reverse phase A. C. bias from transformer 103. It is essential, of course, that the circuit be phased out in such a manner that the firing peaks occur during the positive half cycles of voltage on the anode 114 of tube 106.

Reference is now directed to Fig. 10 wherein a typical voltage cycle of alternating current is illustrated by the sine wave 121. The timer 61 causes the tube 106 to become conductive at predetermined intervals, for instance from five to fifteen times a second or whatever time spacing is found sufficient to enable the tissues of the fish to reach approximately normal before the next impulse. It is necessary, however that the beginning of each impulse occur at a predetermined time in a given voltage cycle of the power supply, this is the function of the synchronizer or phase shift control 62. The firing of the tube 106 must occur during the positive half cycle of voltage on the anode 114 for as soon as the voltage cycle becomes negative the grid 111 blocks flow of current. By adjustment of the phase shift control 62, any or all of the positive half of the voltage cycle may be used. In practice, however the most effective and economical portion of the half cycle to utilize is the 90 to 180 degree quadrant. Thus, when the phase shift control 62 permits discharge of tube 73 which controls discharge of tube 106, the voltage immediately rises in the fish barrier (there being practically no inductance) to the voltage value of the power supply existing at that instant. The voltage then decays as a sine function to zero when the tube 106 again blocks current flow. The shaded area 122 represents that portion of a voltage half cycle when the impulse is generated in the fish barrier. While the impulse exists only a fraction of a second, the impulse duration is not only substantially longer than obtained by a condenser discharge, but also the average voltage value bears a materially greater relation to the peak value of the impulse in the case of the sine wave discharge characteristic of the arrangement shown in Fig. 9 than in the logarithmic discharge characteristic of the arrangement shown in Figs. 6 and 7.

Though we have shown and described particular embodiments of our invention, we do not wish to be limited thereto, but desire to include in the scope of our invention the constructions, combinations and arrangements as set forth in the appended claims.

We claim:

1. In an electrical fish barrier adapted to be installed in waterways; a set of relatively closely spaced electrode elements positioned across the waterway and extending from the surface to the bottom of the waterway to form a planular grid; a set of electrode plates each plate positioned edgewise in the waterway and equally spaced from said grid, there being fewer electrode plates than electrode elements, but their combined areas being greater than said elements whereby the current density tends to decrease from said electrode elements to the edges of the electrode plates remote therefrom and an energizer for applying electrical impulses of such magnitude and frequency as will shock fish without injury.

2. In an electrical fish barrier adapted to be installed in waterways; a set of relatively closely spaced electrode elements positioned across the waterway and extending from the surface to the bottom of the waterway to form a planular grid; a set of electrode plates, each plate positioned edgewise in the waterway and equally spaced from said grid, there being fewer electrode plates than electrode elements, but their combined areas being greater than said elements whereby the current density tends to decrease from said electrode elements to the edges of the electrode plates remote therefrom, and an energizer adapted to generate electrical impulses wherein the average voltage bears a material relationship to the peak voltage, and whereby such impulses are sufficiently spaced to enable a fish to recover between impulses.

3. An electrical fish barrier comprising: electrode means adapted to be immersed in a waterway to establish an electrified zone therebetween, and an energizer for generating electrical impulses including, a field core, an input coil wound thereon and connected with a source of electrical energy, a pick up coil also wound on said core and connected with said electrodes, and an armature wheel having a permeable section and a non-permeable section adapted to pass alternately within the field established in said core, the relationship of said permeable section and core being such as to establish an electrical impulse having an average value approaching its peak value, and means for rotating said armature wheel at such speed as to minimize cumulative effect of said impulses on a fish within said electrified zone.

4. An electrical fish barrier comprising: electrode means adapted to be immersed in a waterway to establish an electrified zone therebetween, and an energizer for generating electrical impulses including, a condenser adapted to discharge into said electrodes, a thermionic valve adapted periodically to permit discharge of said condenser, means for determining the frequency at which said thermionic valve permits discharge of said condenser, means for controlling the voltage peak established upon discharge of said condenser, and means for modifying the rate of condenser discharge to dampen the peak of such discharge and prolong the duration thereof.

5. An electrical fish barrier comprising: electrode means adapted to be immersed in a waterway to establish an electrified zone therebetween; and an energizer for applying electrical impulses to said electrodes including, a thermionic valve controlling application of alternating current to said electrodes, means for controlling the frequency at which said thermionic valve becomes conductive, and timing means for instigating conductivity of said thermionic valve at a predetermined point in the voltage wave cycle of said alternating current calculated to cause automatic blocking of said alternating current by said thermionic valve at the succeeding node point of said voltage wave cycle.

6. An electrical fish barrier comprising: electrode means adapted to be immersed in a waterway to establish an electrified zone therebetween; and an energizer for applying electrical impulses to said electrodes including; a source of alternating current connected with said electrodes, a power control unit interposed between said source and electrodes including a thermionic valve normally blocking application of said alternating current, a timer for regulating the frequency at which said thermionic valve opens, and a phase shift and synchronizing network for determining the duration of the electrical impulses permitted by said thermionic valve.

7. In an electrical fish barrier adapted to be installed in waterways; a set of electrode elements; a set of electrode means spaced from the electrode elements; said elements and means both distributed uniformly from the surface to the bottom of the waterway and substantially parallel to define the ends of an electrified zone having substantially the same length at the surface of the waterway as the bottom thereof; and an energizer for applying electrical impulses to said electrodes including; a source of alternating current connected with said electrodes, a power control unit interposed between said source and electrodes including a thermionic valve normally blocking application of said alternating current, a timer for regulating the frequency at which said thermionic valve opens, and a phase shift and synchronizing network for determining the duration of the electrical impulses permitted by said thermionic valve.

8. In an electrical fish barrier adapted to be installed in waterways: a set of electrode means; a set of electrode elements spaced from the electrode means; an energizing circuit connected to said means and elements; said elements and means distributed uniformly from the surface to the bottom of the waterway and substantially parallel to define an electrified zone having substantially the same length at the surface of the waterway as at the bottom thereof, the electrode elements being located with respect to the electrode means in the direction from which fish enter the waterway and having a greater total area than said electrode means whereby the current density increases toward said electrode means.

9. An electrical fish barrier as set forth in claim 1 wherein said energizer includes means for varying the frequency of such electrical impulses, and means for controlling the wave pattern of said impulses to effect a steep potential wave front and maintain a material average potential value for the duration of the impulse.

FRANKLIN SAMUEL BONNER.
MORT ROY MILLER.